Dec. 27, 1938.    J. CANNATA    2,141,902
AUTOMOBILE DOOR LOCKING DEVICE
Filed Jan. 19, 1938
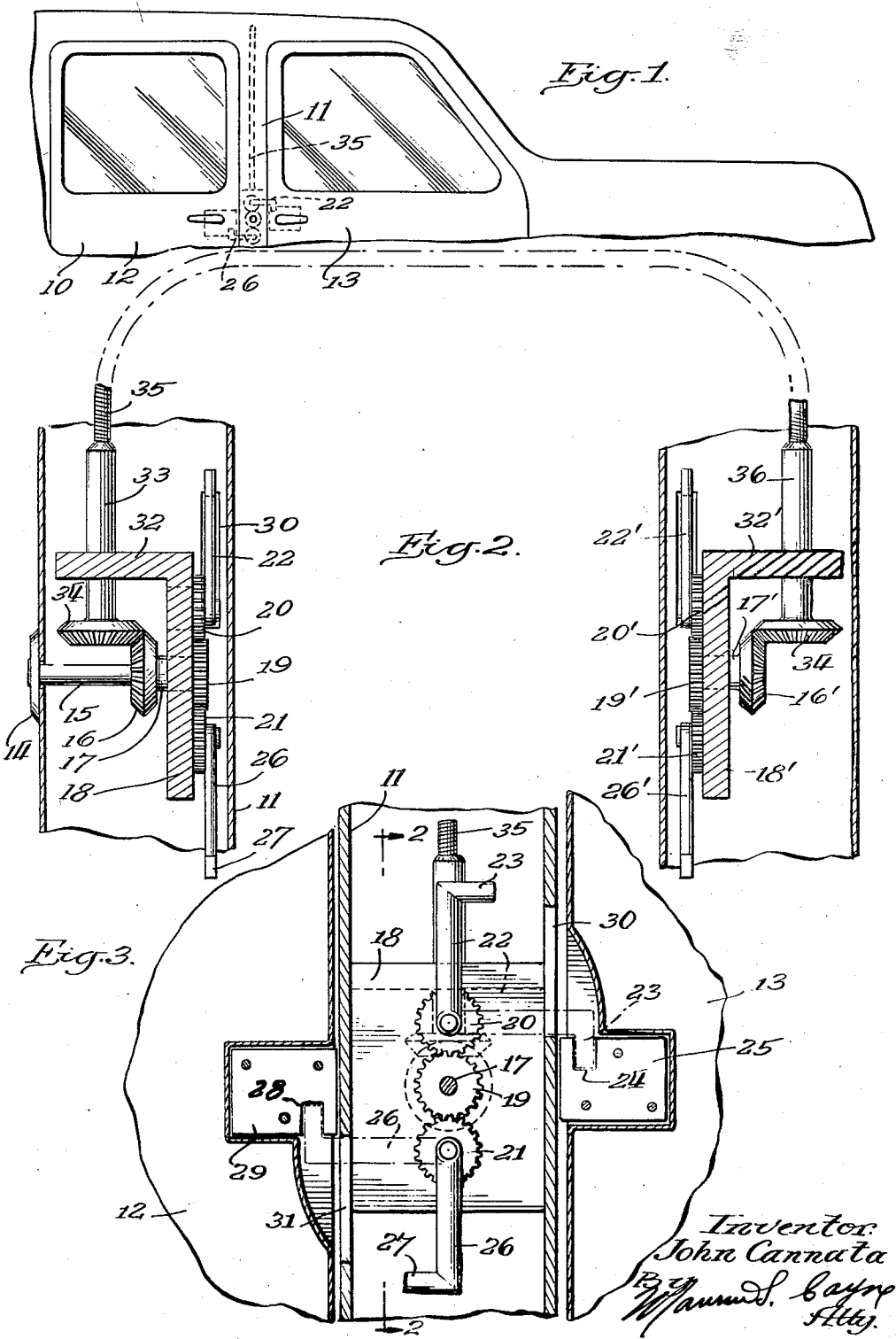

Patented Dec. 27, 1938

2,141,902

UNITED STATES PATENT OFFICE 2,141,902

AUTOMOBILE DOOR LOCKING DEVICE

John Cannata, Chicago, Ill.

Application January 19, 1938, Serial No. 185,684

1 Claim. (Cl. 70—264)

This invention relates generally to a locking device for the doors of automobiles and the like and more particularly to an arrangement whereby all of the doors of a vehicle may be manually locked or unlocked simultaneously in a single operation from a single point.

It is the main object of this invention to provide a locking arrangement for the doors of a motor vehicle whereby all of the doors of said vehicle will be connected to a central lock actuating mechanism and remotely controlled and operated from a single point in a single operation.

Another object of this invention is to provide a locking arrangement for the doors of a motor vehicle which may be installed to existing constructions of vehicles without extensive changes thereto and when so installed will be highly efficient for carrying out the purposes for which it is designed.

A further object of this invention is to provide a locking mechanism of the character described for the doors of a motor vehicle, which arrangement will be simple in construction, assembly and operation, which will be durable in use and which at the same time be efficient in operation and practically fool-proof.

With the foregoing and other objects in view which will appear as the description proceeds, the invention consists in certain novel features of construction, arrangement and combination of parts hereinafter more fully described, illustrated in the accompanying drawing, and particularly pointed out in the appended claim, it being understood that various changes in the form, proportion, size and minor details of the structure may be made without departing from the spirit or sacrificing any of the advantages of the invention.

For the purpose of facilitating an understanding of my invention, I have illustrated in the accompanying drawing a preferred embodiment thereof, from an inspection of which, when considered in connection with the following description, my invention, its mode of construction, assembly and operation, and many of its advantages should be readily understood and appreciated.

Referring to the drawing in which the same characters of reference are employed to indicate corresponding or similar parts throughout the several figures of the drawing:

Fig. 1 is a fragmentary side elevational view of a portion of an automobile body illustrating one point of application of the key controlled lock through which the remaining lock elements are actuated;

Fig. 2 is a transverse sectional view showing one form of connection between the key controlled lock and the parts upon the opposite side of the automobile and taken substantially on the line 2—2 of Fig. 3; and Fig. 3 is an enlarged lateral sectional view through one of the side posts of the automobile and its associated parts.

Referring to the drawing more specifically by characters of reference, the numeral 10 designates generally the body of an automobile having, in the case of a four-door closed sedan, an upright post 11 between the two doors 12 and 13. At a position adjacent the door handles and in the post 11, as shown in the drawing, a conventional form of key controlled lock 14 is provided. Said lock carries upon the inner end of its rotative part 15 a bevel gear 16. Partial rotation of this gear 16 occurs when the key (not shown) is turned in the lock 14.

The gear 16 is connected to a stud 17, which stud is mounted for rotation in the angle bar or bracket 18, said bracket being supported within the hollow post 11 and is fixedly secured thereto as more clearly illustrated in Fig. 2 thereof. The stud 17 is provided on its end opposite the end carrying the bevel gear 16 with a spur gear 19, whereby rotation of the bevel gear 16 will similarly rotate the spur gear 19. The bracket 18 has also mounted thereon for rotation the spur gears 20 and 21, which gears are arranged one above and one below the spur gear 19, with their axes in alignment with the axis of the gear 19, said gears 20 and 21 being in constant mesh with the gears 19, whereby rotation of the gear 19 in a counterclock-wise direction as viewed in Fig. 3, will impart rotation to the gears 20 and 21 in a clock-wise direction.

Rigidly secured to the gear 20 for rotation therewith is one end of a bolt 22, the opposite end being provided with the substantially right angle portion 23 adapted when the gear 20 is rotated approximately ninety degrees (90°) to engage within a recess 24 provided therefor in the latch 25, which latching is normally used for holding the door 13 in a closed position. Similarly the gear 21 has rigidly secured thereto one end of a bolt 26 for rotation therewith, said bolt 26 being provided with a substantially right angle portion 27 at its opposite end, which end is adapted to be received in a recess 28 provided therefor in the latch 29 of the door 12 when the gear 21 is swung substantially ninety degrees (90°) from the full line position of the bolt shown in Fig. 3 to the dotted line position shown in said figure. Suitable openings 30 and 31 may be provided in the sides of the post member 11 for permitting the passage of said bolts 22 and 26 respectively into engagement with their respective latches 25 and 29.

Supported in the horizontally arranged portion 32 of the bracket 18 is a shaft 33 on one end of which is provided a bevel gear 34 which is arranged in constant mesh with the bevel gear 16 whereby rotation of the gear 16 will impart similar rotation to the gear 34. A flexible shaft 35 connects the shaft 33 with a similar shaft 36 supported at the opposite side of the car body in the horizontally arranged portion 32' of a bracket 18', said shaft 36 being provided at its free end with a bevel gear 34' which is in constant mesh with a spur gear 16', the latter being mounted on one end of a stud shaft 17' supported in the bracket 18' and having provided on its other end opposite the bevel gear 16', a spur gear 19'. The spur gear 19' is arranged for constant mesh with the gears 20' and 21', said gears having rigidly secured thereto for rotation therewith the bolts 22' and 26' respectively, which bolts are identical in shape and construction as the bolts 23 and 26, and which cooperate with the latches provided on that side of the car body in identically the same manner as illustrated in Fig. 3.

From the foregoing it will be readily apparent that the present invention offers a most simple and at the same time a positive means for simultaneously locking all of the four doors of a vehicle from a single point in a single operation. It is to be understood that in the case of vehicles having a total of two doors only, the application of my mechanism will be substantially the same with the difference that the gear 21 and its associated bolt 26 may be eliminated. It is also to be understood that the invention is not limited to the particular type of connecting means between the locking mechanisms on the two sides of the car as some means other than the flexible cable may be utilized for transmitting the motion from the bevel gear 34 to the bevel gear 34'. It is also apparent that the mechanism comprises only a few parts which may be readily assembled in operative condition and when so assembled will be simple in operation, requiring little or no attention and is so arranged that it will not readily get out of operative condition. It will also be noted that the mechanism is positive in its operation and is capable of assembly and installation in existing construction with a minimum amount of time and labor.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claim.

What I claim and desire to secure by Letters Patent of the United States is:

In a device for simultaneously locking the doors of a motor vehicle provided with centrally located side posts against which the doors of the vehicle are adapted to close, a substantially L-shaped bracket secured within each of said side posts adjacent each pair of doors, a gear rotatably mounted on one of the legs of each of said L-shaped brackets, a pair of gears also secured to said bracket and being arranged for constant mesh and in substantially vertical alignment with said first-mentioned gear, a bolt secured to each of said second-mentioned gears for rotation therewith, each of said bolts being provided with a right-angle extension adapted to enter a socket in the door for engagement with a socket provided with a conventional latch normally holding said door in closed position, a bevelled gear connected with each of said first-mentioned gears for rotation therewith, a second bevelled gear in mesh with said last-mentioned bevelled gear and rotatably supported on the second leg of each of said L-shaped brackets, means connecting together the said last-mentioned bevelled gears whereby the rotation of one will impart similar and corresponding rotation to the other, and key operated mechanism for actuating said first-mentioned bevelled gears supported by said first-mentioned leg of said L-shaped brackets.

JOHN CANNATA.